United States Patent [19]
Novotny et al.

[11] Patent Number: 5,431,344
[45] Date of Patent: Jul. 11, 1995

[54] SLIDING THROAT GAS TURBINE ENGINE NOZZLE

[75] Inventors: Rudolph J. Novotny, Stuart; David E. Wendt, Jupiter; Gary D. Jones, Jensen Beach; James S. Johnson, Jupiter, all of Fla.

[73] Assignee: United Technologies Corporation, Hartford, Conn.

[21] Appl. No.: 152,625

[22] Filed: Nov. 12, 1993

[51] Int. Cl.⁶ .......................... F02K 1/08; B64C 15/00
[52] U.S. Cl. .......................... 239/265.35; 239/265.37; 60/271
[58] Field of Search ...................... 239/265.11, 265.19, 239/265.33-265.41; 60/271

[56] References Cited
U.S. PATENT DOCUMENTS

| | | | |
|---|---|---|---|
| 3,044,258 | 7/1962 | Carlton et al. | 239/265.33 |
| 3,081,596 | 3/1963 | Barrett et al. | 239/265.41 |
| 3,098,352 | 7/1963 | Taub et al. | 239/265.27 |
| 3,642,209 | 2/1972 | Stahl | 239/265.19 |
| 3,814,325 | 6/1974 | McCardle, Jr. et al. | 239/265.39 |
| 4,141,501 | 2/1979 | Nightingale | 239/265.39 |
| 4,440,346 | 4/1984 | Wiley | 239/265.39 |

*Primary Examiner*—Karen B. Merritt
*Attorney, Agent, or Firm*—Edward L. Kochey, Jr.

[57] ABSTRACT

Exit area control panels 18 are supported for movement at an angle with respect to the nozzle axis 12. A varying exit area is formed as actuator 26 axially positions the panels 18. In each exit area control panel 18, there is slidably supported a throat area control panel 28, driven by actuator 32. A sliding throat is achieved as the two panels 18,28 are moved in each quadrant. Yaw and pitch vectoring is accomplished with selective positioning of the two panels.

12 Claims, 6 Drawing Sheets

SLIDING THROAT GAS TURBINE ENGINE NOZZLE

TECHNICAL FIELD

The invention relates to convergent/divergent nozzles for aircraft gas turbine engines, and in particular to an arrangement for controlling the shape and size of the nozzle.

BACKGROUND OF THE INVENTION

Maximum thrust and efficiency of a gas turbine engine is achieved when the exhaust passes through a discharge nozzle which controls expansion, and maximizes the discharge velocity. When an aircraft operates at both subsonic and supersonic speeds the exhaust nozzle pressure ratio varies over a substantial range.

Under subsonic flight conditions the pressure ratio is relatively small and a nozzle having a substantially convergent shape is desirable. At supersonic flight conditions when the nozzle pressure ratio is high the appropriate geometry is achieved by a nozzle having a convergent portion followed by a divergent portion. This is referred to as a convergent/divergent nozzle.

Many designs have been made which provide the variable geometry which will effect proper operation at both subsonic and supersonic speeds. For the subsonic condition where only the convergent nozzle is desired there is only a nominal divergence, this being selected to assure that the throat area remains upstream of the divergent flaps. At supersonic speeds, means are supplied to effect the appropriate divergent flowpath downstream of the throat. Many of these designs require additional structure and weight to achieve the actuation of the divergent flaps. It is apparent that for an aircraft engine light weight and simplicity are desirable features. It further is useful to have a structure which may be easily sealed against leakage.

In modern military aircraft additional maneuverability is desirable. This may be achieved by using pitch and yaw vectoring which requires discharging the exhaust gas selectively with a velocity component other than straight back. Again simplicity and lightweight is desirable in achieving this vectoring. It is also desirable that the structure used have a minimum impact on the external configuration of the nozzle and aircraft.

SUMMARY OF THE INVENTION

In the preferred embodiment the engine achieves throat area and discharge area control as well as pitch and yaw vectoring. This is all accomplished by the simple mechanism of using four exit area control panels which slide substantially axially, but at an angle with respect to the axis so that the area is reduced on aft movement of the panels. Each of the panels carries within it a throat area control panel, which moves with respect to the exit area control panel to set the relative location of the throat with respect to the exit area control panels.

Rather than skewing the walls of the divergent nozzle to obtain pitch control, the nozzle is manipulated to obtain a throat area plane perpendicular to the desired flow direction and at an angle with the vertical. This being the sonic restriction of the nozzle, the flow is established perpendicular to this plane thereby achieving pitch control.

The throat area plane is further modified by having a swept throat. Here the plane established by the throat restriction is swept to an angle toward the side of the aircraft and away from perpendicular to the axial flow through the nozzle. This provides a discharge having a thrust in a horizontal direction. Manipulation of the two sides of the nozzle to obtain differential flow, and thus a differential thrust achieves yaw operation.

Limited portions of the preferred embodiment could be used to obtain a controllable convergent/divergent nozzle without pitch or yaw control, or a nozzle having only pitch or yaw control.

The gas turbine engine has a static structure with an opening for an axial flow of gas therethrough. At least one, and preferably four, area control panel extends into the flowpath and is slidingly supported from the static structure. It is driven for axial movement at an angle with the axis.

A throat area control panel is slidably supported in each exit area control panel. The throat area control panel extends into the flowpath and is located on the gas side of the exit area control panel. This throat area control panel is driven along a flowpath relative to the throat area control panel into the flowpath preferably along a slightly arcuate path.

DESCRIPTION OF THE PREFERRED EMBODIMENT

Figure 1:
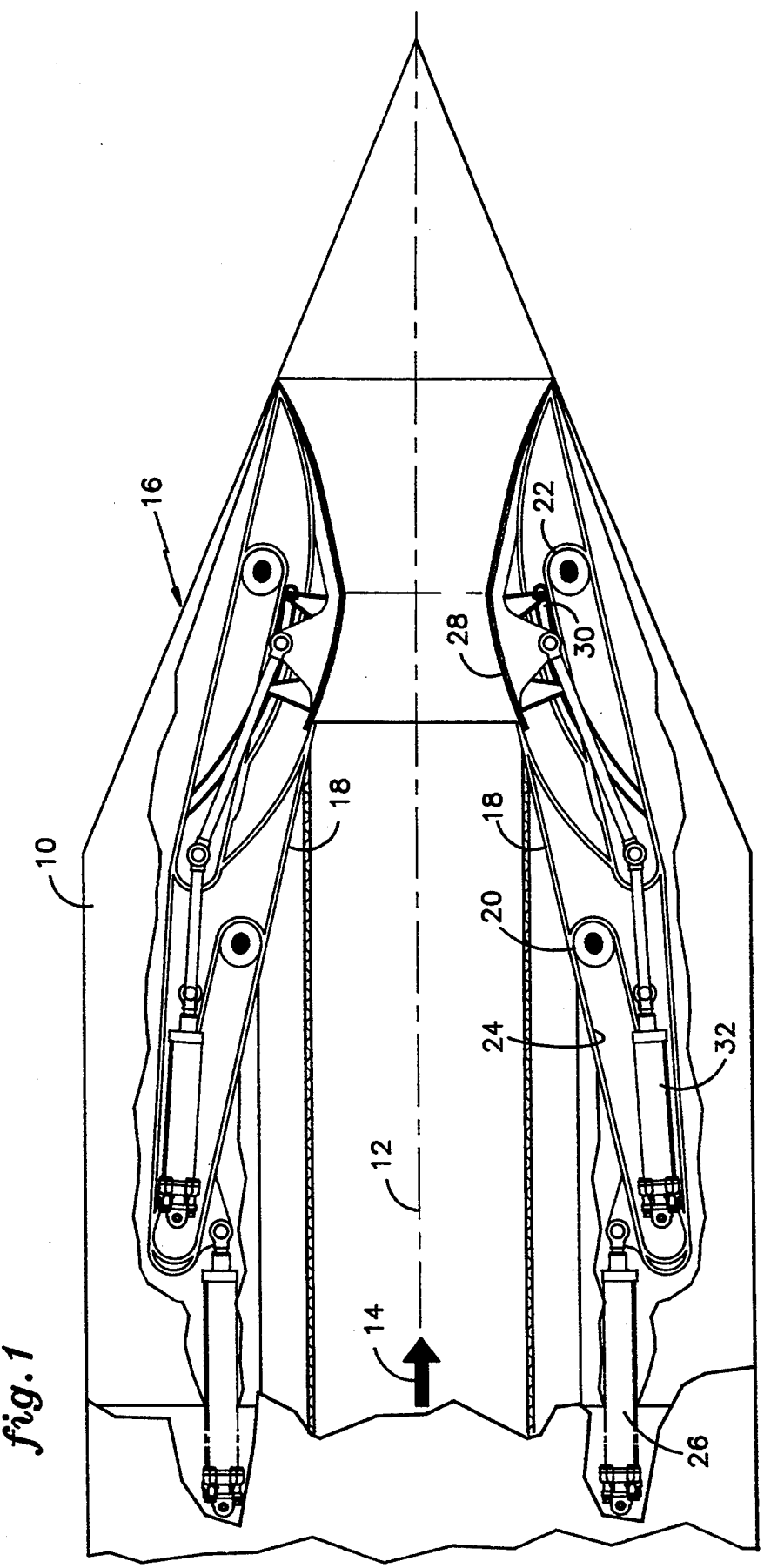
FIG. 1 is a side sectional detail of the nozzle.

Referring to FIG. 1 the static structure 10 has an axis 12 and an opening for the flow of exhaust gas 14 through the nozzle 16.

Four exit area control panels 18 are each supported on two bearings, 20 and 22. These bearings are supported on the static structure 10 and fit within slots 24 on the panels. These slots are positioned for axial movement of the panels at an angle with respect to the axis 12. Accordingly when the exit drive means in the form of actuator 26 drives the panels with respect to the static structure they move into or out of the flowpath, thereby effecting a sliding action with axial relocation of the throat of the nozzle.

A throat area control panel 28 is slidably supported in slot 30 of each exit area control panel. A throat drive means in the form of actuator 32 drives the panel for movement into or out of the gas stream with respect to the exit area control panel 18. The slot 30 is arcuate in shape to maintain the opening 34 between the throat area control panel and the exit area control panel at a uniform minimum distance.

Figure 2:
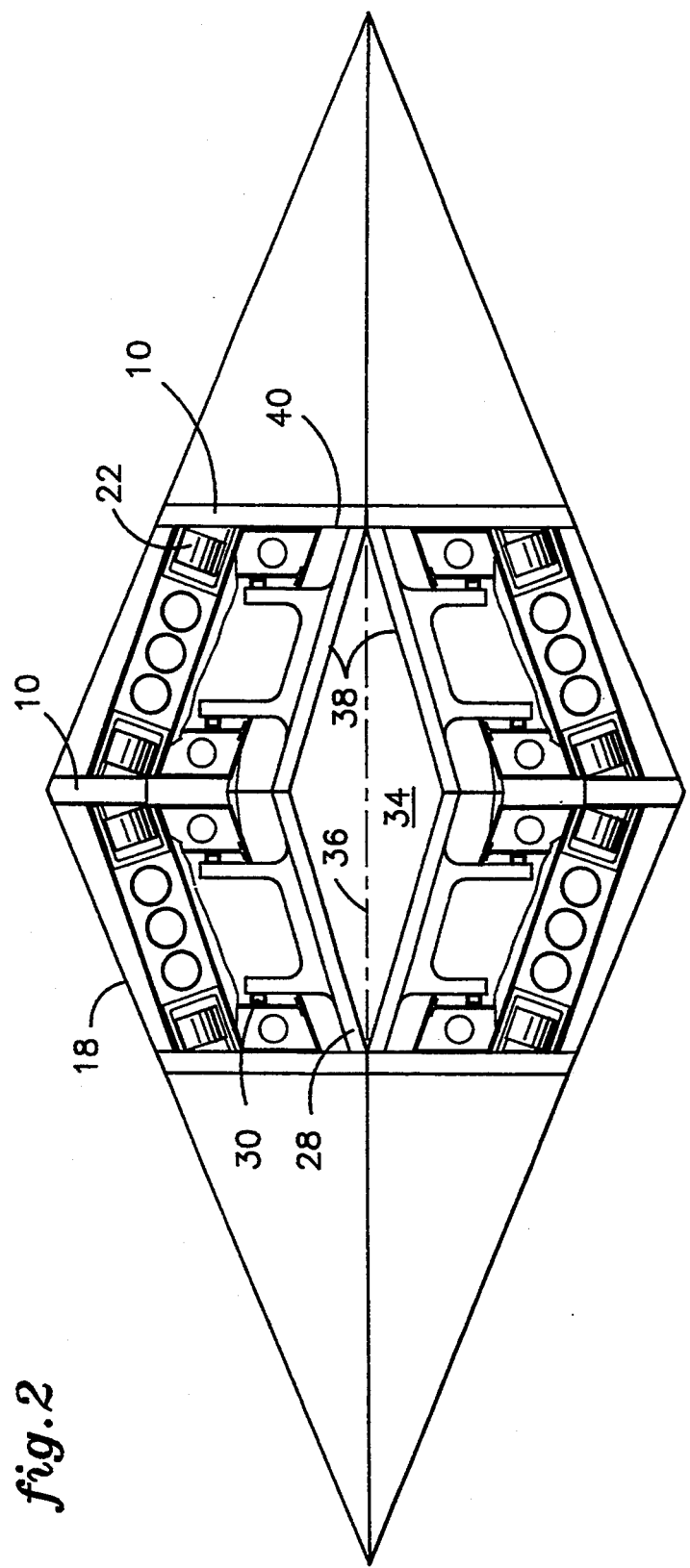
FIG. 2 is a section end view including the support of the panels.

FIG. 2 is a sectional end view through FIG. 1 showing the four exit area control panels 18 and four throat area control panels 28. It can be seen that the flow area 34 is of a diamond shape with a width to height ratio of about 3 to 1. The opening shown in FIG. 1 is the opening towards the center of the nozzle, while the panels are touching at the wall. This is accomplished by establishing the structure such that each of the panels has a gas side surface extending transverse to the flowpath at an angle with respect to a horizontal line 36 forming the top and bottom sides of the diamond. The diamond shape more conveniently fits within an air frame design than other shapes. It should be noted that as the panels are withdrawn in the forward direction the gas sides 38 of the panels move apart and a truncated diamond opening is obtained with flat sides formed by the walls 40 of the static structure 10.

Figure 3:
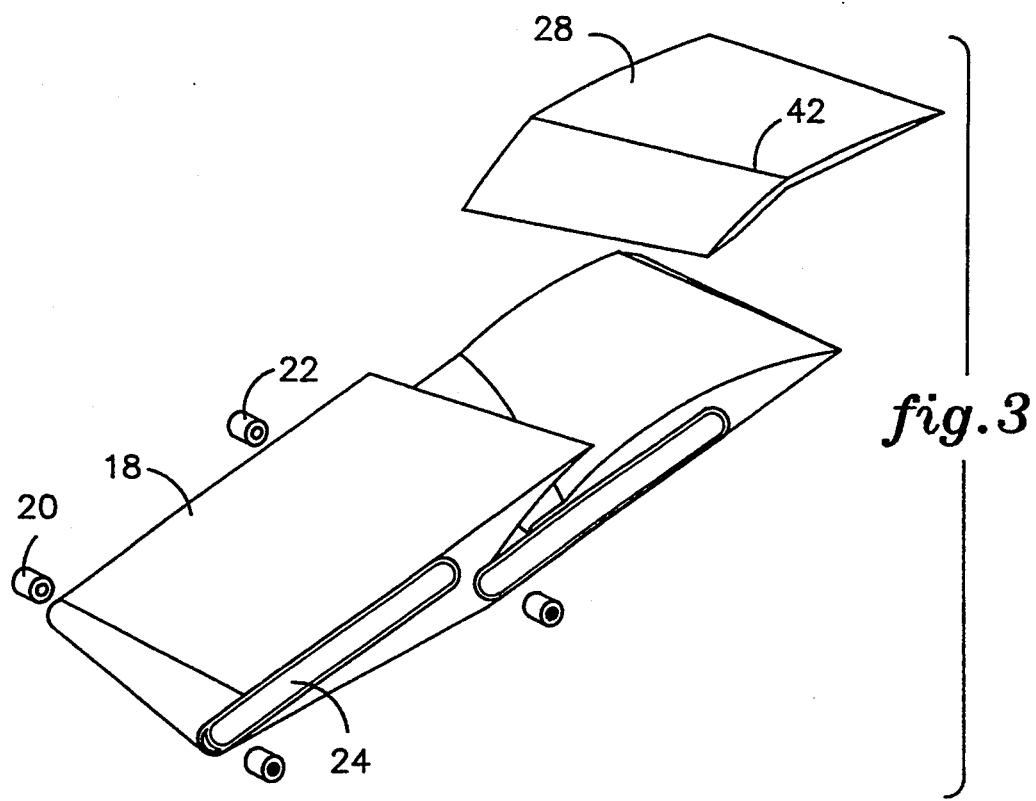
FIG. 3 is an exploded view of the exit control and throat control panels.

FIG. 3 shows an exploded isometric view of one throat area control panel and one exit area control panel. The throat area control panel 28 has a break point line 42 which is shaped to form a flow restricting throat at an angle other than perpendicular with the axis 12. Flow passing through this throat will therefore be skewed from the axial direction to a direction perpendicular to the throat plane. The sharp demarkation of line 42 is illustrated here primarily for discussion purposes. It is not essential that there be such a sharp demarkation, although this would facilitate stabilizing the throat location.

Figure 4:
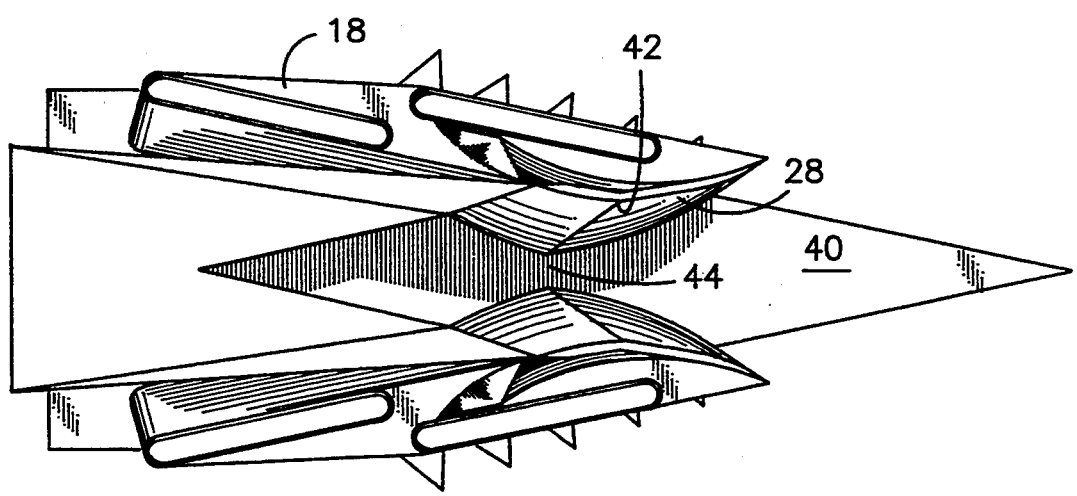
FIG. 4 is a side section at maximum afterburning conditions.
Figure 5:
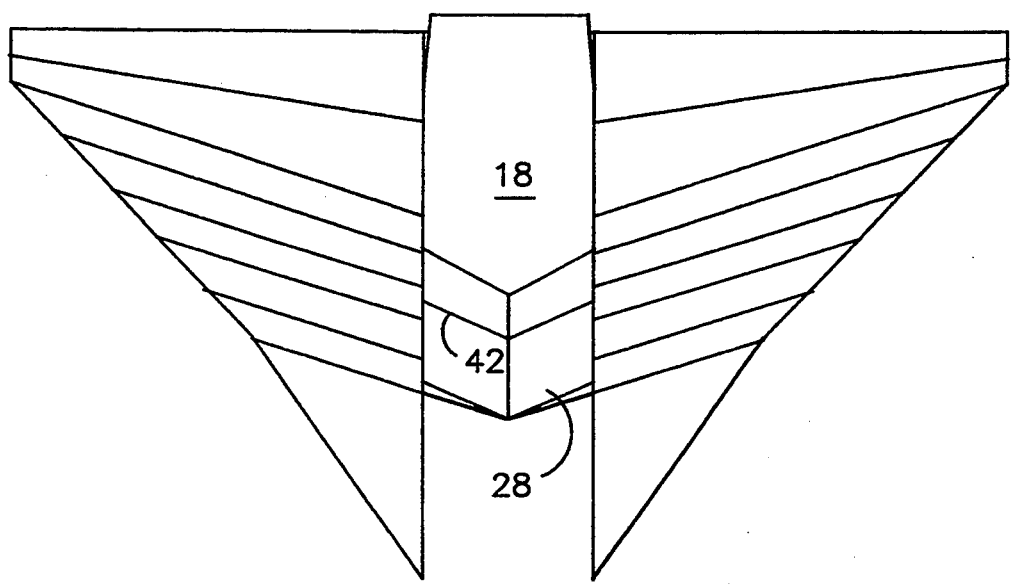
FIG. 5 is a top section at maximum afterburning conditions.

FIGS. 4 and 5 are side and top sections respectively of the nozzle at maximum afterburning condition without vectoring. The exit area control panel 18 is moved forward at or near the limit of it's forward movement. The throat area control panels 28 are still located aft with respect to the exit area control panel. Opening 44 against the wall 40 of the nozzle can be seen since this represents the truncated portion of the diamond occurring with the nozzle open to this condition.

The particular location of the control panels is selected as showing a typical unvectored, high expansion ratio setting for the nozzle. The angular orientation of line 42 can better be seen in these two views than in the isometric view.

Figure 6:
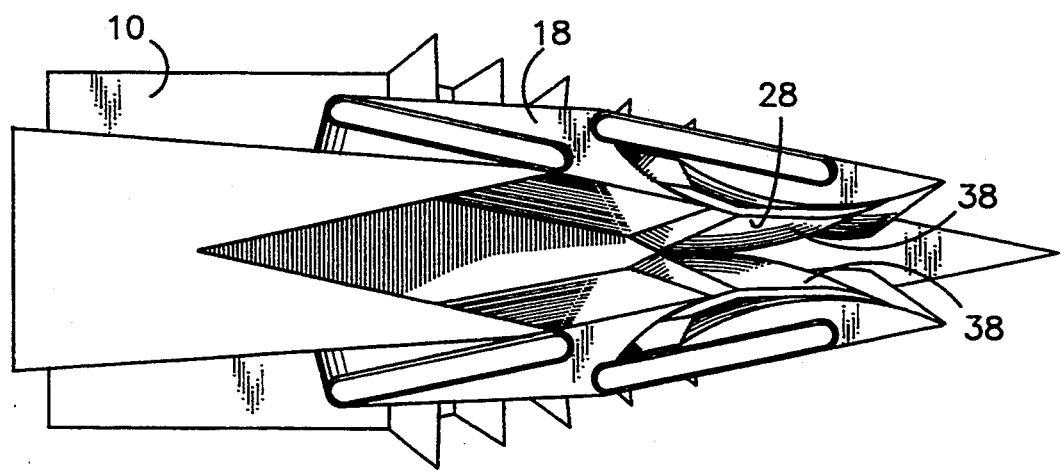
FIG. 6 is a side section at intermediate power.
Figure 7:
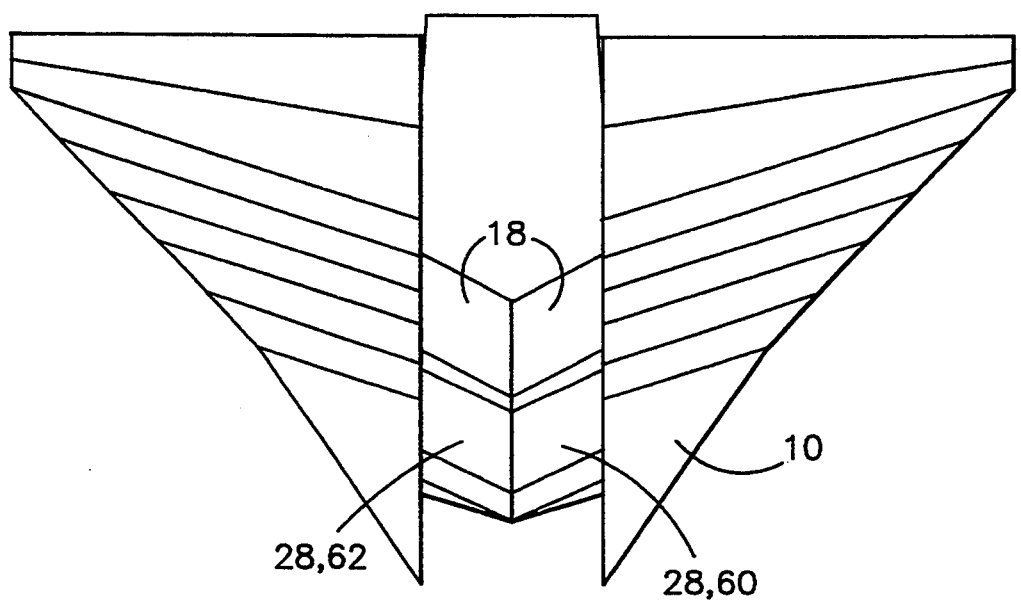
FIG. 7 is a top section at intermediate power.
Figure 8:
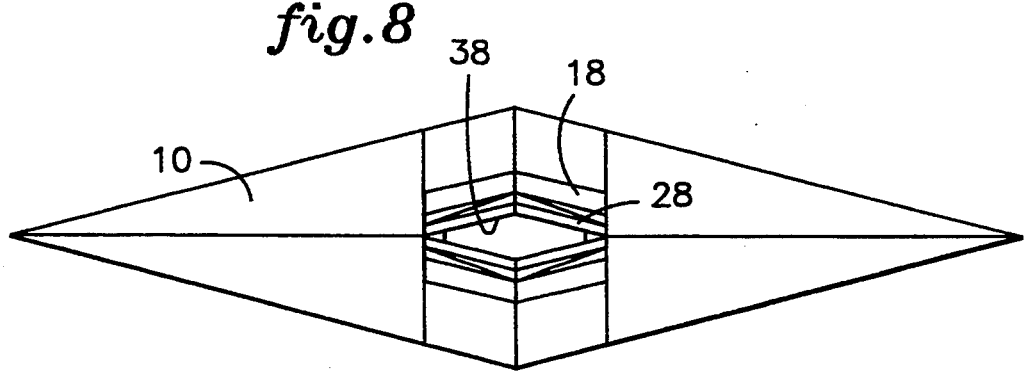
FIG. 8 is an end view at intermediate power.

FIGS. 6, 7 and 8 illustrate side sectional, top sectional and end views of the nozzle at intermediate power. The exit area control panels 18 are moved aft near the limit of their travel while throat area control panels 28 are moved forward toward intermediate position within the exit area control panels. At this minimum flow condition the opposing faces 38 of the panels are touching at the outboard location. The particular location of the panels under this condition is for an unvectored low expansion ratio setting.

Figure 9:
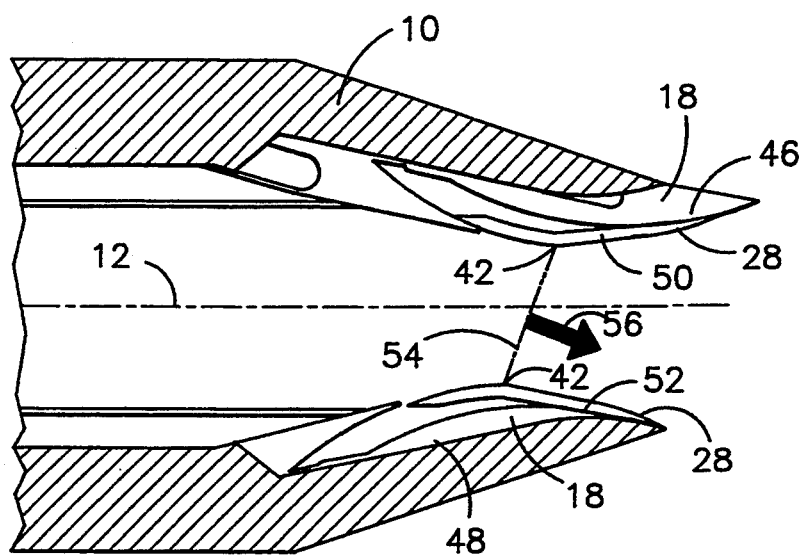
FIG. 9 is a side section showing vectoring down at maximum afterburning.

FIG. 9 is a sectional side view showing the vector down position at the afterburning or maximum flow area position. The two upper exit area control panels 46 are moved to a more aft position than the two lower exit area control panels 48. Furthermore within the upper panels the two upper throat area control panels 28,50 are moved aft slightly less than the two lower throat area control panels 28,52. This sets the lines 42 at different axial positions resulting in the throat plane 54 being at an angled down position with respect to the axis 12. Since the sonic flow must pass through this plane at a direction perpendicular to the plane, the gases are ejected along a line 56 with the downward component to achieve pitch control.

Figure 10:
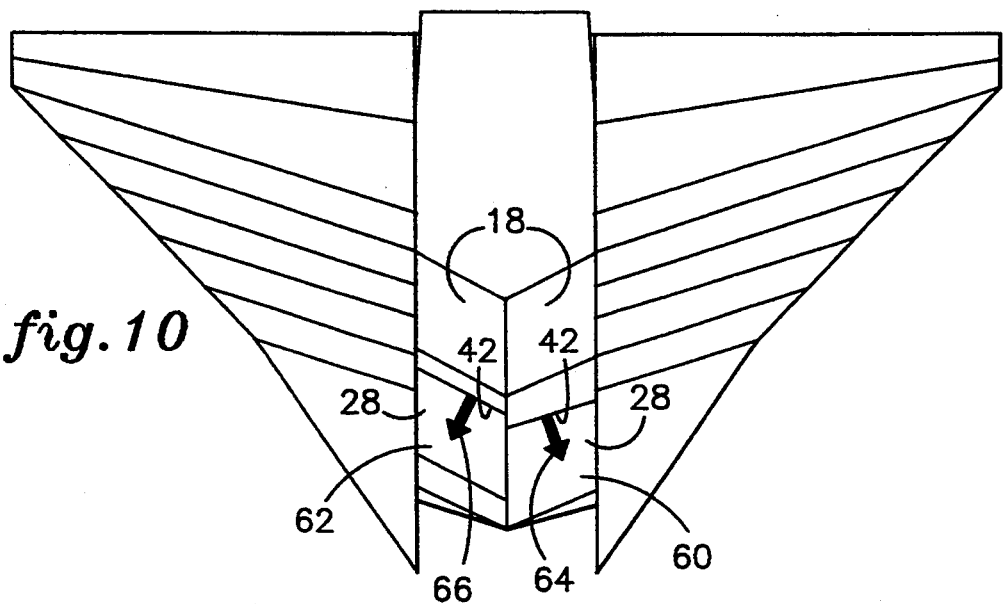
FIG. 10 is a top section showing yaw at intermediate power.
Figure 11:
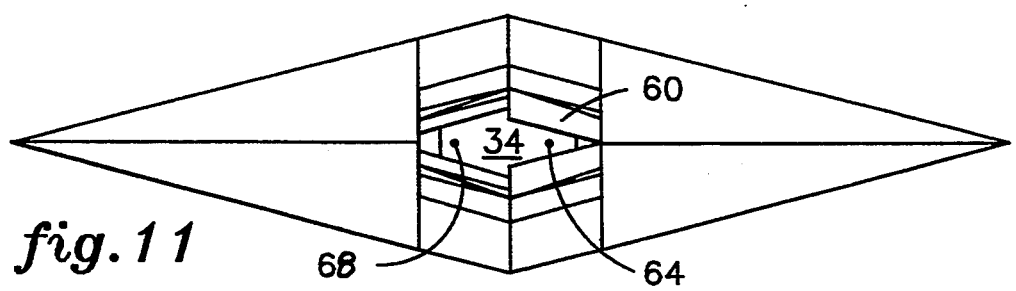
FIG. 11 is an end view showing yaw at intermediate power.

FIGS. 10 and 11 are a top sectional view and an end view respectively of the yaw position at intermediate power. Exit area control panels 18 are moved near the full aft position as they were in FIG. 6, 7 and 8. The throat area control panels 28 are however located differently on the two sides of the nozzle. Viewed in the direction of the gas flow, panel 28 on the lefthand side, now designated as panel 60 is moved full aft while the righthand panel 28 now designated as panel 62 is moved more toward the forward position.

The flow nozzle area 34 is now skewed with a lesser area 64 on the lefthand side compared to the larger area 68 on the righthand side. Because of the swept flow established by lines 42 the flow 64 from the left side of the nozzle has a leftward component while the flow 66 from the righthand side of the nozzle has a rightward component. With the different flow areas there are different flow quantities. This results in the flow 66 dominating, providing a rightward component to effect yaw control of the aircraft. Aerodynamic model testing has shown this method of yaw vectoring to be effective to thirteen degrees.

Even during vectoring maneuvers, the external nozzle surfaces remain in a constant position. This would presumably be selected at the minimum loss boatail angle. Variable convergent/divergent control as well as vectoring thrust are accomplished without interfering with the optimum design of the aircraft in the nozzle area.

Seals are always required between the moving parts of the nozzle and the surrounding static structure. Since all movement in this nozzle is substantially linear between two components, all internal seal surfaces have a constant clearance. They also have sealing surfaces at a constant angle during all modes of operation. Simple low leakage rate straight line seals can be used, reducing the complexity and increasing the efficiency of the overall system.

The internal surface area is at a minimum during the maximum temperature afterburning operation, since the panels are fully withdrawn at this time.

The external nozzle surface approaches the simplicity of a fixed shroud nozzle with only four suitably angled seal lines which are constant during all modes of operation. The overall complexity of external fairings is reduced because the number of fairings is minimized, as well as the hardware required to move the fairings. This also leaves the overall impression of desirable smoothness on the exterior of the airplane.

We claim:

1. A gas turbine engine convergent/divergent exhaust nozzle comprising:
   a static structure having an axis and an opening forming an axial flowpath for the flow of gas therethrough;
   at least one exit area control panel extending into said flowpath and slidingly supported from said static structure for axial movement at an angle with said axis, said at least one exit area control panel having a gas flow side and a structure side;
   a throat area control panel located substantially within and slidably supported for axial movement in each said exit area control panel, each said throat area control panel extendable into said flowpath from said corresponding exit area control panel, forming a minimum flow area flow restricting throat and with a flowpath entering component relative to said throat area control panel;

exit drive means for selectively locating each said exit area control panel; and throat drive means for selectively locating each said throat area control panel.

2. A gas turbine engine convergent/divergent exhaust nozzle as in claim 1, further comprising:

at least two exit area control panels with the gas sides of said at least two exit area control panels facing each other.

3. A gas turbine engine convergent/divergent exhaust nozzle as in claim 2, further comprising:

said at least two exit area control panels moving further into said axial flowpath as they are moved aft.

4. A gas turbine engine convergent/divergent exhaust nozzle as in claim 3, further comprising:

each said throat area control panel slidably supported at a corresponding exit area control panel along an arcuate path.

5. A gas turbine engine convergent/divergent exhaust nozzle as in claim 2, further comprising:

said static structure having four quadrants; and said at least two exit area control panels comprising an exit area control panel in each of said four quadrants.

6. A gas turbine engine convergent/divergent exhaust nozzle as in claim 5, further comprising:

the gas flow side of each of said exit area control panels having a gas side surface extending transverse to said flowpath at an angle with a horizontal line, whereby a diamond shaped opening is formed.

7. A gas turbine engine convergent/divergent exhaust nozzle as in claim 6, further comprising:

each said throat area control panel slidably supported at a corresponding exit area control panel along an arcuate path.

8. A gas turbine engine convergent/divergent exhaust nozzle as in claim 6, further comprising:

each said throat control panel shaped to form said flow restricting throat at an angle other than perpendicular to said axis, whereby flow passing through the throat will be skewed from the axial direction.

9. A gas turbine engine convergent/divergent exhaust nozzle as in claim 5, further comprising:

each said throat area control panel slidably supported at a corresponding exit area control panel along an arcuate path.

10. A gas turbine engine convergent/divergent exhaust nozzle as in claim 5, further comprising:

each said throat area control panel shaped to form said flow restricting throat at an angle other than perpendicular to said axis, whereby flow passing through the throat will be skewed from the axial direction.

11. A gas turbine engine convergent/divergent exhaust nozzle as in claim 1, further comprising:

each said throat area control panel slidably supported at a corresponding exit area control panel along an arcuate path.

12. A gas turbine engine convergent/divergent exhaust nozzle as in claim 1, further comprising:

each said throat area control panel shaped to form said flow restricting throat at an angle other than perpendicular to said axis, whereby flow passing through the throat will be skewed from the axial direction.

* * * * *